(12) United States Patent
Waxler et al.

(10) Patent No.: US 8,543,691 B1
(45) Date of Patent: Sep. 24, 2013

(54) CROSS-PLATFORM, TARGETED, LOW-LEVEL HARDWARE/SOFTWARE DIAGNOSTICS LOADER

(75) Inventors: John P Waxler, Dresher, PA (US); Matthew Galligan, Delran, NJ (US); Bruce Waldron, Newtown, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 313 days.

(21) Appl. No.: 13/018,098

(22) Filed: Jan. 31, 2011

(51) Int. Cl.
*G06F 21/50* (2013.01)

(52) U.S. Cl.
USPC ............. 709/224; 709/223; 709/226

(58) Field of Classification Search
None
See application file for complete search history.

(56) References Cited

U.S. PATENT DOCUMENTS

| 2004/0078682 | A1* | 4/2004 | Huang | 714/37 |
| 2007/0233633 | A1* | 10/2007 | Keith | 706/60 |
| 2010/0257132 | A1* | 10/2010 | Collard et al. | 706/47 |
| 2012/0321071 | A1* | 12/2012 | Fisher, Jr. | 379/265.09 |

* cited by examiner

*Primary Examiner* — Hassan Kizou
*Assistant Examiner* — Tejis Daya
(74) *Attorney, Agent, or Firm* — Ryan J. Friedl; Kyle Eppele

(57) ABSTRACT

A method involves receiving a requested response from a remote computer system, comparing the requested response to a plurality of stored responses from computer systems representing a plurality of different operating systems, hardware platforms, and software platforms, and loading one or more operating system-specific, hardware platform-specific, and software platform-specific command modules onto the remote computer system based upon the comparison. The command modules may be configured to provide the remote computer system access to operating system-specific, hardware platform-specific, and software platform-specific diagnostics tools, as well as specific configuration management tools. The specific diagnostics tools may be configured to ascertain targeted information about the remote computer system including health status of the remote computer system hardware, such as memory, processor, and hard drive, and installed software, such as the health status of running software, installed patches, and installed applications.

20 Claims, 4 Drawing Sheets

CROSS-PLATFORM, TARGETED, LOW-LEVEL HARDWARE/SOFTWARE DIAGNOSTICS LOADER

FEDERALLY-SPONSORED RESEARCH AND DEVELOPMENT

The Cross-Platform, Targeted, Low-Level Hardware/Software Diagnostics Loader is assigned to the United States Government and is available for licensing for commercial purposes. Licensing and technical inquiries may be directed to the Office of Research and Technical Applications, Space and Naval Warfare Systems Center, San Diego, Code 72120, San Diego, Calif., 92152; voice (619) 553-2778; email ssc_pac_T2@navy.mil. Reference Navy Case Number 100645.

BACKGROUND

When creating software, it is often necessary to compile and maintain several different versions of the software. Because these different versions may work with different operating systems and/or different hardware, many configuration management issues may arise. Further, installation issues are more likely to occur if it is unclear which version needs to be installed. Redundant work may also be performed when updates affect multiple versions. A need exists for a system and method that overcome such drawbacks.

DETAILED DESCRIPTION OF SOME EMBODIMENTS

Figure 1:
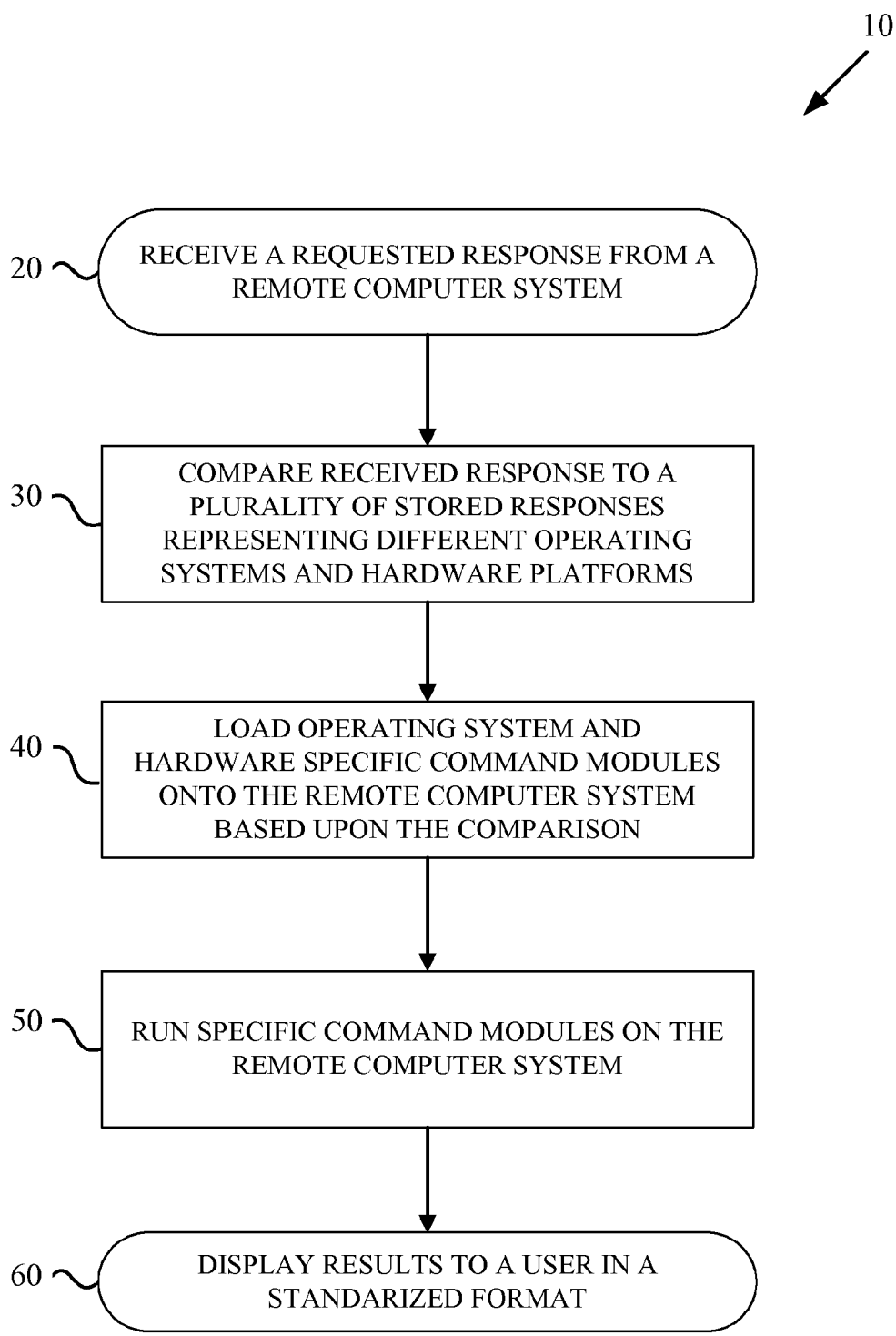
FIG. 1 shows a flowchart of an embodiment of a method in accordance with the Cross-Platform, Targeted, Low-Level Hardware/Software Diagnostics Loader.

FIG. 1 shows a flowchart of an embodiment of a method 10 in accordance with the Cross-Platform, Targeted, Low-Level Hardware/Software Diagnostics Loader. Some or all of the steps of method 10 may be stored on a non-transitory computer readable storage medium, wherein the steps are represented by computer-readable programming code. The steps of method 10 may also be computer-implemented using a programmable device, such as a computer-based system. Method 10 may comprise instructions that, when loaded into a computer-based system, cause the system to execute the steps of method 10. Method 10 may be implemented using various programming languages, such as "Java", "C", or "C++". As an example, method 10 may be implemented on a system such as systems 100 and 300 shown in FIGS. 2 and 4, respectively. For illustrative purposes, method 10 will be discussed with reference to system 100.

Figure 2:
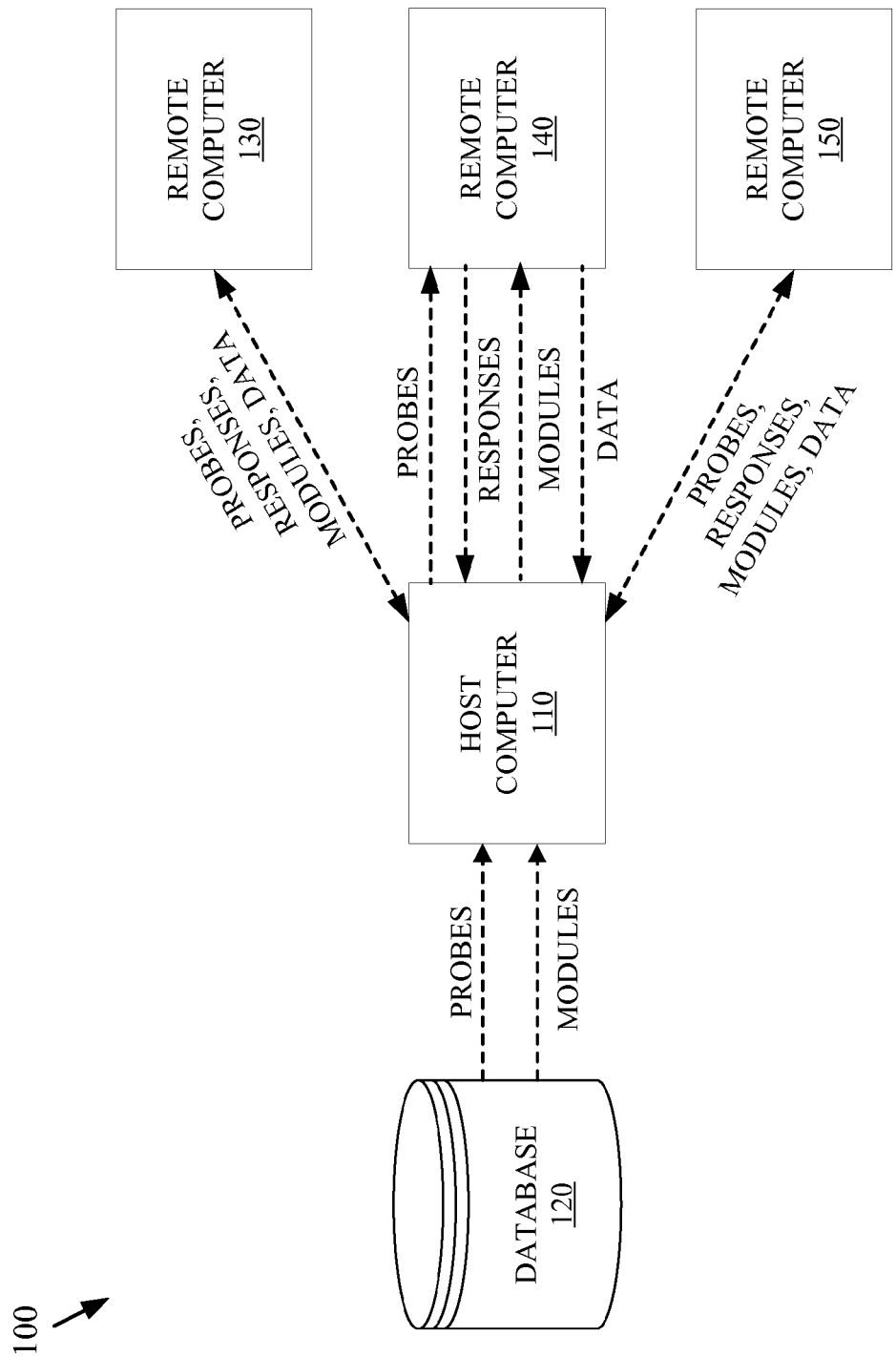
FIG. 2 shows a data flow diagram of an embodiment of a system for implementing a method in accordance with the Cross-Platform, Targeted, Low-Level Hardware/Software Diagnostics Loader.

Referring to FIGS. 1 and 2, method 10 may begin at step 20, which involves receiving a requested response from a remote computer system. The received response may be received by host computer 110 from a remote computer such as remote computer 130, 140, or 150. Host computer 110 may be connected to database 120 and remote computers 130, 140, and 150 via a wired or wireless connection. Remote computers 130, 140, and 150 may either be stand-alone systems or networked systems. The requested response may be received in response to a probe sent from host computer 110 to the remote computer. In some embodiments, the requested response contains information pertaining to the operating system, hardware platform, and/or software platform of the remote computer.

In some embodiments, step 20 may include simultaneously receiving multiple responses from a plurality of remote computers, such as remote computers 130, 140, and 150. In such a scenario, each remote computer may provide information pertaining to their particular operating system, hardware platform, and/or software platform.

Next, step 30 involves comparing the requested response to a plurality of stored responses from computer systems representing a plurality of different operating systems, hardware platforms, and software platforms. Examples of stored responses are shown in the following Table 1:

TABLE 1

| Operating System | Hardware Platform | Software Platform |
|---|---|---|
| Solaris 10 | Sun 4u (v440) | Image Product Library (IPL) |
| Solaris 8 | Sun 4u (v480) | Common Ground System (CGS) |
| Windows XP | Dell Server (PowerEdge 1950) | Falcon View |
| Mac OS X Snow Leopard | Mac Mini | PDAS |

Step 30 may be performed by a processor contained within host computer 110. In some embodiments, the stored responses may be stored within host computer 110. In other embodiments, the stored responses may be stored within database 120. In embodiments where a probe is sent to the remote computer, the stored responses may be stored within the probe definition.

Following step 30, step 40 involves loading one or more specific command modules onto the remote computer system based upon the comparison. The specific command modules may conform to a standard computer interface. The specific command modules are configured to provide the remote computer system access to specific diagnostics tools. In some embodiments, the specific command modules comprise operating system-specific command modules and the specific diagnostics tools comprise operating system-specific diagnostics tools. In some embodiments, the specific command modules comprise hardware platform-specific command modules and the specific diagnostics tools comprise hardware platform-specific diagnostics tools. In some embodiments, the specific command modules comprise software platform-specific command modules and the specific diagnostics tools comprise software platform-specific diagnostics tools. As an example, if a response is received that a remote computer is running Windows XP on a Dell Workstation, a command module and/or diagnostic tool specific to this configuration will be loaded onto the remote computer.

In some embodiments, the specific command modules may further be configured to provide the remote computer system access to specific system tools such as configuration management tools, analysis tools, diagnostic tools, or other tools that probe a system for information. For example, such system configuration management tools may include Sun Management Center, Dell OMSA/OMCI, Solaris Common Array Manager, and anti-virus software.

The specific diagnostics tools may be configured to ascertain targeted information about the remote computer system. The targeted information may include a health status of the remote computer system hardware. For example, the target information may include a memory health status, a processor health status, and a hard drive health status. The targeted information may further include a health status of the remote computer system installed software. For example, the target information may include a running software health status, an installed patches health status, and an installed applications health status.

After step 40, method 10 may proceed to step 50, which involves running, on the remote computer system, the one or more specific command modules that were loaded on the remote computer system. The command modules are configured to collect targeted information from the remote computer system. Such targeted information may include diagnostic data and metric data related to the remote computer system. The diagnostic/metric data may then be returned to the host computer 110. In embodiments where diagnostic/metric data is received from multiple remote computers, the data may be returned in a common language.

Next, step 60 may involve displaying the results to a user in a standardized format. For example, the results may be displayed on a graphical user interface as described in U.S. patent application Ser. No. 12/893,018 to Waxler et al., filed on Sep. 29, 2010, entitled "Simplified System Status Advisor Providing Uniform Cross-Platform Status Information, the content of which is fully incorporated by reference herein. As an example, each of the specific command modules may be configured to translate platform-specific data into a common language format usable across all supported systems. This reduces training requirements and allows for a user familiar with a system using this technology to perform diagnostics and monitoring across a wider range of systems than would otherwise have been possible without additional training.

Figure 3:
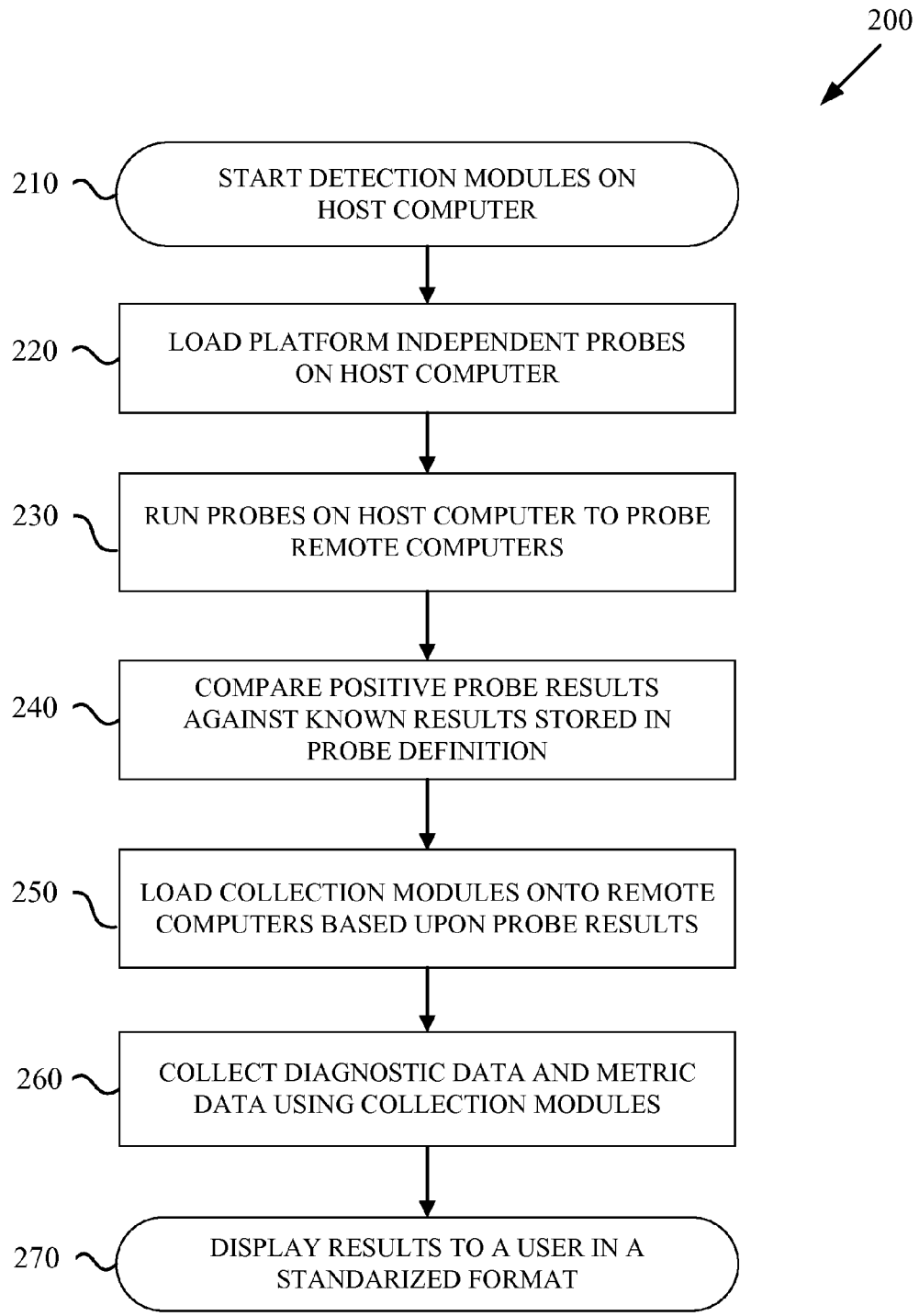
FIG. 3 shows a flowchart of another embodiment of a method in accordance with the Cross-Platform, Targeted, Low-Level Hardware/Software Diagnostics Loader.

FIG. 3 shows a flowchart of another embodiment of a method 200 in accordance with the Cross-Platform, Targeted, Low-Level Hardware/Software Diagnostics Loader. Some or all of the steps of method 200 may be stored on a non-transitory computer readable storage medium, wherein the steps are represented by computer-readable programming code. The steps of method 200 may also be computer-implemented using a programmable device, such as a computer-based system. Method 200 may comprise instructions that, when loaded into a computer-based system, cause the system to execute the steps of method 10. Method 200 may be implemented using programming languages such as "Java", "C", or "C++". As an example, method 200 may be implemented on a system such as systems 100 and 300 shown in FIGS. 2 and 4, respectively. For illustrative purposes, method 200 will be discussed with reference to system 100.

Method 200 may begin at step 210, where detection modules are started on host computer 110. Such detection modules may include a storage detection module, hardware detection module, and software detection module. As used herein, the term "module" refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. Thus, the use of the term "module" herein, indicates reference to such software modules or implementations thereof. The terms "module" and "software module" can be utilized interchangeably with one another to describe the same element or feature.

Next, step 220 involves loading platform independent probes on host computer 110. The probes may include a storage probe, hardware probe, and software probe. As an example, the probes may be loaded onto host computer 110 from database 120. Step 220 may also involve loading diagnostic processes onto host computer 110 from database 120.

Method 200 may then proceed to step 230, which involves running the probes on the host computer to probe one or more remote computers 130, 140, and 150 for information pertaining to the specific probe. For example, the storage probe will probe for storage-related information and the hardware probe will probe for hardware-related information. Each separate probe contains various methods for polling data from the remote computer, such as network, API, OS level communication, direct hardware interaction, and driver communication. The results from the probes may then be transmitted back to host computer 110 from the remote computer, as shown in FIG. 2.

Upon receiving the probe results, host computer 110 may compare the results against known results at step 240. As an example, such known results may be stored within each probe definition. The known results may also be stored within either host computer 110 or database 120. If a match is determined between the probe results and the known results, this indicates that the probe result is a positive indicator of the presence of a particular system, storage device, operating system, hardware configuration, software configuration, etc.

Probes that return positive comparison results are associated with a specific set of specific data collection/diagnostic modules. These specific modules, such as operating system-specific modules, hardware platform-specific modules, and software platform-specific modules, are then loaded onto the remote computers at step 250 for the type of system, software, storage, etc. . . . , that the probe is associated with. As an example, if a probe that determines that a Dell server is running an application, Dell server specific modules are loaded.

At step 260, the specific modules are run on the remote computer and collect specific data, such as diagnostic data and metric data. The modules are run asynchronously so that various methods can be run simultaneously, allowing for rapid and comprehensive system diagnostics/data collection. The data results from the remote computer systems are returned to host computer 110 in a manner that is consistent across all of the modules. For example, a Dell server module and a Solaris server module will return the same types of data in the same format and using the same language. At step 270, host computer 110 may then display the results to a user in a standardized format across all platforms. In some embodiments, the various modules or data metrics may be enabled or disabled on the fly so that only relevant data is collected and reported.

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Figure 4:
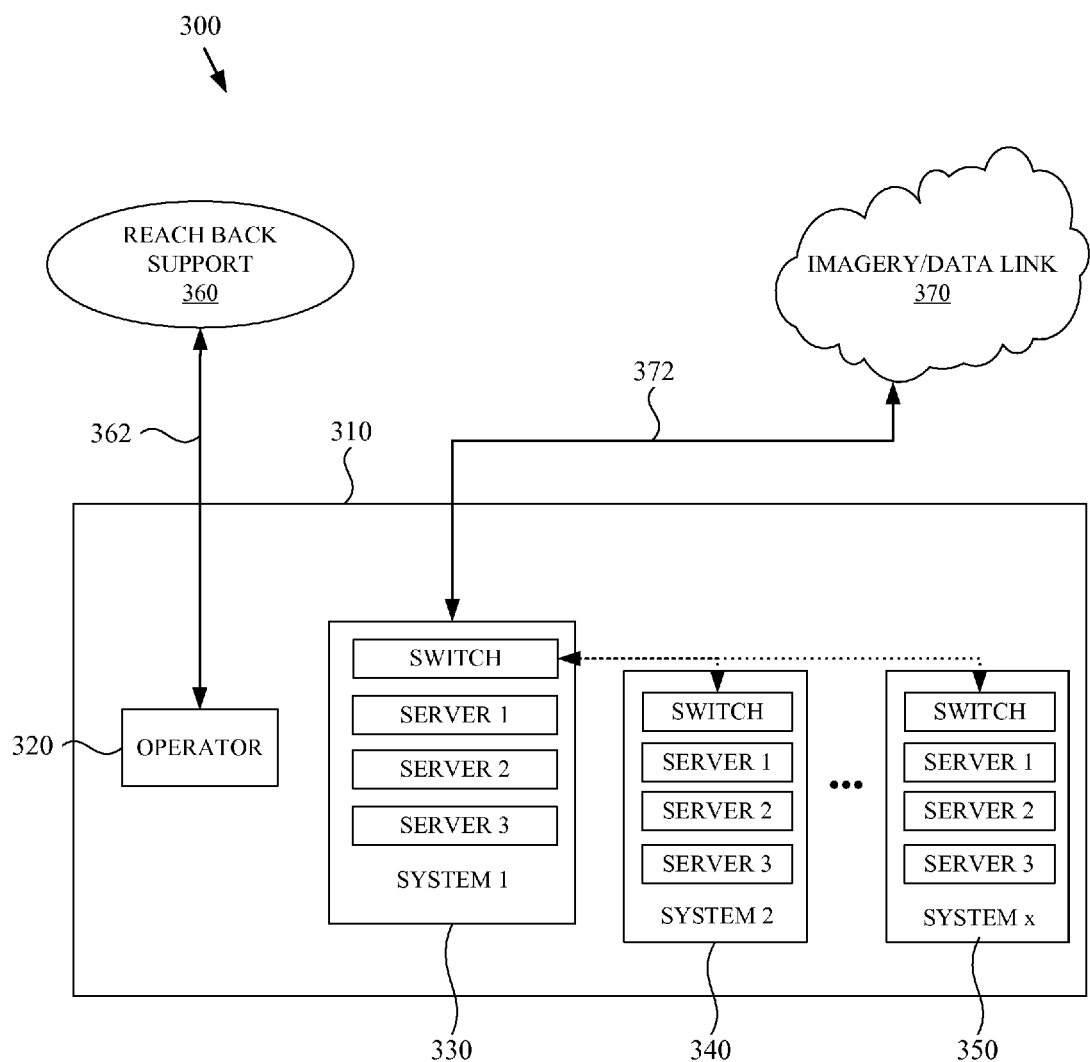
FIG. 4 shows a diagram of an embodiment of an operational system configuration for implementing the methods in accordance with the Cross-Platform, Targeted, Low-Level Hardware/Software Diagnostics Loader.

FIG. 4 shows a diagram of an embodiment of a system architecture 300 for implementing methods 10 and 200. System 300 may include a first node 310, a second node 360 and a third node 370. First node 310 may comprise an operator 320, a first system 330, a second system 340, and one or more additional systems up to an $x^{th}$ system 350, where x is an integer greater than two. Each of systems 330, 340, and 350 may include a switch and multiple servers, such as servers 1, 2, and 3. Systems 330, 340, and 350 may be networked via their respective switches.

Operator 320 may be connected to second node 360 via link 362. Second node 360 may be a reach back support function. Reach back support may be directly polled via the system over the network or it may be contacted in a partially connected scenario by transmitting, for example, XML log files generated by the various command modules, with the XML log files then combined to form one system snapshot. The system snapshot may then be ingested into an electronic system at reach back support. The XML files may be self-descriptive and human readable so that failing all else, they can be read by the system operator, or by reach back support using standard text editing tools. Further, system 330 may be connected to third node 370 via link 372. Node 370 may be an imagery/data link/GIG connection.

System 300 provides an illustration of a system monitor configuration referred to as the Simplified System Status Advisor (S3 Advisor). The system monitor configuration saves time for the operator, system administrator, and technical support by providing a unique view of system health. The system monitor configuration is designed to aid both inexperienced end-users and skilled help desk technicians in understanding the health of a system. The system monitor monitors hardware, software, and network status, and provides a simplified view of these areas. The system monitor configuration may assist personnel by displaying system problems quickly and directing novice users to critical issues.

The systems and methods disclosed herein serve to abstract away hardware and software platform-specific tasks for users and software, allowing derived works to function with a standard set of tools when performing a variety of tasks, such tasks including diagnostics, anti-virus, information assurance scanning, system optimization, and enforcement of best practices. For example, to perform a task of locking down an administrator account without the systems and methods disclosed herein, many implementations across different platforms would need to be considered. Use of the systems and methods disclosed herein would allow such a task to be standardized, resulting in improved efficiency and reduced error.

Many modifications and variations of the Cross-Platform, Targeted, Low-Level Hardware/Software Diagnostics Loader are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A computer-implemented method comprising the steps of:
   receiving a requested response from a remote computer system, the requested response comprising information pertaining to at least one of an operating system, a hardware platform, and a software platform of the remote computer system;
   comparing the requested response to a plurality of stored responses from computer systems representing a plurality of different operating systems, hardware platforms, and software platforms; and
   loading one or more specific command modules onto the remote computer system based upon the comparison, the specific command modules specific to one or more of the operating system, the hardware platform, and the software platform of the remote computer system identified in the requested response, the specific command modules configured to provide the remote computer system access to specific diagnostics tools.

2. The computer-implemented method of claim 1, wherein the specific command modules comprise operating system-specific command modules and the specific diagnostics tools comprise operating system-specific diagnostics tools.

3. The computer-implemented method of claim 1, wherein the specific command modules comprise hardware platform-specific command modules and the specific diagnostics tools comprise hardware platform-specific diagnostics tools.

4. The computer-implemented method of claim 1, wherein the specific command modules comprise software platform-specific command modules and the specific diagnostics tools comprise software platform-specific diagnostics tools.

5. The computer-implemented method of claim 1, wherein the specific command modules are further configured to provide the remote computer system access to specific system configuration management tools.

6. The computer-implemented method of claim 1, wherein the specific diagnostics tools are configured to ascertain targeted information about the remote computer system.

7. The computer-implemented method of claim 6, wherein the targeted information comprises a health status of the remote computer system hardware and a health status of the remote computer system installed software.

8. The computer-implemented method of claim 1 further comprising the steps of:
   running the one or more specific command modules loaded on the remote computer system; and
   displaying the results to a user in a standardized format.

9. A computer-implemented method comprising the steps of:
   receiving a requested response from a remote computer system, the requested response comprising information pertaining to at least one of an operating system, a hardware platform, and a software platform of the remote computer system;
   comparing the requested response to a plurality of stored responses from computer systems representing a plurality of different operating systems, hardware platforms, and software platforms; and
   loading one or more operating system-specific, hardware platform-specific, and software platform-specific command modules onto the remote computer system based upon the comparison, the operating system-specific, hardware platform-specific, and software platform-specific command modules specific to the operating system, the hardware platform, and the software platform of the remote computer system identified in the requested response, the operating system-specific, hardware platform-specific, and software platform-specific command modules configured to provide the remote computer system access to operating system-specific, hardware platform-specific, and software platform-specific diagnostics tools.

10. The computer-implemented method of claim 9, wherein the operating system-specific, hardware platform-specific, and software platform-specific command modules are further configured to provide the remote computer system access to operating system-specific, hardware platform-specific, and software platform-specific configuration management tools.

11. The computer-implemented method of claim 9, wherein the operating system-specific, hardware platform-specific, and software platform-specific diagnostics tools are configured to ascertain targeted information about the remote computer system including a health status of the remote computer system hardware and a health status of the remote computer system installed software.

12. The computer-implemented method of claim 11, wherein the health status of the remote computer system hardware includes memory health status, processor health status, and hard drive health status.

13. The computer-implemented method of claim 11, wherein the health status of the remote computer system installed software includes running software health status, installed patches health status, and installed applications health status.

14. The computer-implemented method of claim 9 further comprising the steps of:
running the one or more operating system-specific, hardware platform-specific, and software platform-specific command modules loaded on the remote computer system; and
displaying the results to a user in a standardized format.

15. A non-transitory computer-readable storage medium having a method encoded thereon, the method represented by computer-readable programming code, the method comprising the steps of:
receiving a requested response from a remote computer system, the requested response comprising information pertaining to at least one of an operating system, a hardware platform, and a software platform of the remote computer system;
comparing the requested response to a plurality of stored responses from computer systems representing a plurality of different operating systems, hardware platforms, and software platforms; and
loading one or more specific command modules onto the remote computer system based upon the comparison, the specific command modules specific to one or more of the operating system, the hardware platform, and the software platform of the remote computer system identified in the requested response, the specific command modules configured to provide the remote computer system access to specific diagnostics tools.

16. The non-transitory computer-readable storage medium of claim 15, wherein the operating system-specific, hardware platform-specific, and software platform-specific command modules are further configured to provide the remote computer system access to operating system-specific, hardware platform-specific, and software platform-specific configuration management tools.

17. The non-transitory computer-readable storage medium of claim 15, wherein the specific diagnostics tools are configured to ascertain targeted information about the remote computer system including a health status of the remote computer system hardware and a health status of the remote computer system installed software.

18. The non-transitory computer-readable storage medium claim 17, wherein the health status of the remote computer system hardware includes memory health status, processor health status, and hard drive health status.

19. The non-transitory computer-readable storage medium claim 17, wherein the health status of the remote computer system installed software includes running software health status, installed patches health status, and installed applications health status.

20. The non-transitory computer-readable storage medium of claim 15, wherein the method further comprises the steps of:
running the one or more operating system-specific, hardware platform-specific, and software platform-specific command modules loaded on the remote computer system; and
displaying the results to a user in a standardized format.

* * * * *